US012590907B2

(12) United States Patent
Yamazaki et al.

(10) Patent No.: US 12,590,907 B2
(45) Date of Patent: Mar. 31, 2026

(54) X-RAY INSPECTION APPARATUS

(71) Applicant: ANRITSU CORPORATION, Atsugi (JP)

(72) Inventors: Takeshi Yamazaki, Atsugi (JP); Takashi Kanai, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 304 days.

(21) Appl. No.: 18/260,983

(22) PCT Filed: Jan. 6, 2022

(86) PCT No.: PCT/JP2022/000278
§ 371 (c)(1),
(2) Date: Jul. 11, 2023

(87) PCT Pub. No.: WO2022/153920
PCT Pub. Date: Jul. 21, 2022

(65) Prior Publication Data
US 2024/0068961 A1      Feb. 29, 2024

(30) Foreign Application Priority Data
Jan. 15, 2021      (JP) ................................. 2021-005275

(51) Int. Cl.
*G01N 23/04*          (2018.01)
*G01N 23/083*          (2018.01)

(52) U.S. Cl.
CPC ........... *G01N 23/04* (2013.01); *G01N 23/083* (2013.01); *G01N 2223/1016* (2013.01);
(Continued)

(58) Field of Classification Search
None
See application file for complete search history.

(56) References Cited

U.S. PATENT DOCUMENTS

| | | | |
|---|---|---|---|
| 8,019,040 B2 * | 9/2011 | Kabumoto | G01N 23/04 |
| | | | 378/57 |
| 10,718,725 B2 * | 7/2020 | Miyazaki | G06T 7/0008 |

(Continued)

FOREIGN PATENT DOCUMENTS

| | | | | |
|---|---|---|---|---|
| JP | 2008122184 A | * | 5/2008 | |
| JP | 2013113784 A | * | 6/2013 | |
| JP | 6717784 B2 | | 7/2020 | |

OTHER PUBLICATIONS

ISR issued in PCT/JP2022/000278, mailed Mar. 29, 2022.

*Primary Examiner* — Thomas R Artman
(74) *Attorney, Agent, or Firm* — Greer Burns & Crain Ltd.

(57)          ABSTRACT
An X-ray inspection apparatus includes: a transportation unit that transports an object through an inspection area; an X-ray generation source; an X-ray detection unit; an image data generation unit that generates image data from an output of the X-ray detection unit; a good or not determination unit that performs quality inspection of the object based on the generated image data and a predetermined criterion; and a control unit that controls the inspection, wherein the control unit switches between an inspection mode and a calibration mode in which calibration data for bringing into uniformity the brightness of the image is generated. The control unit includes a calibration data generation unit that generates calibration data based on image data generated before and after a calibration member is inspected in the calibration mode, and a correction unit that corrects the image data of the object, based on the calibration data.

4 Claims, 12 Drawing Sheets

(52) U.S. Cl.
 CPC . *G01N 2223/303* (2013.01); *G01N 2223/306*
  (2013.01); *G01N 2223/618* (2013.01); *G01N*
  *2223/643* (2013.01)

(56) References Cited

U.S. PATENT DOCUMENTS

| | | | |
|---|---|---|---|
| 12,044,634 B2* | 7/2024 | Gill ........................ | G01N 33/02 |
| 2010/0135459 A1* | 6/2010 | Kabumoto ............ | G01N 23/04 |
| | | | 378/207 |
| 2019/0003989 A1* | 1/2019 | Miyazaki ............. | G01N 23/043 |
| 2022/0291148 A1* | 9/2022 | Gill ........................ | G01N 33/02 |
| 2024/0068961 A1* | 2/2024 | Yamazaki ............. | G01N 23/04 |

* cited by examiner

52

Image of calibration member will be taken.

Carry-in a member of PET 20mm thickness.

52a

Cancel

Figure 7:
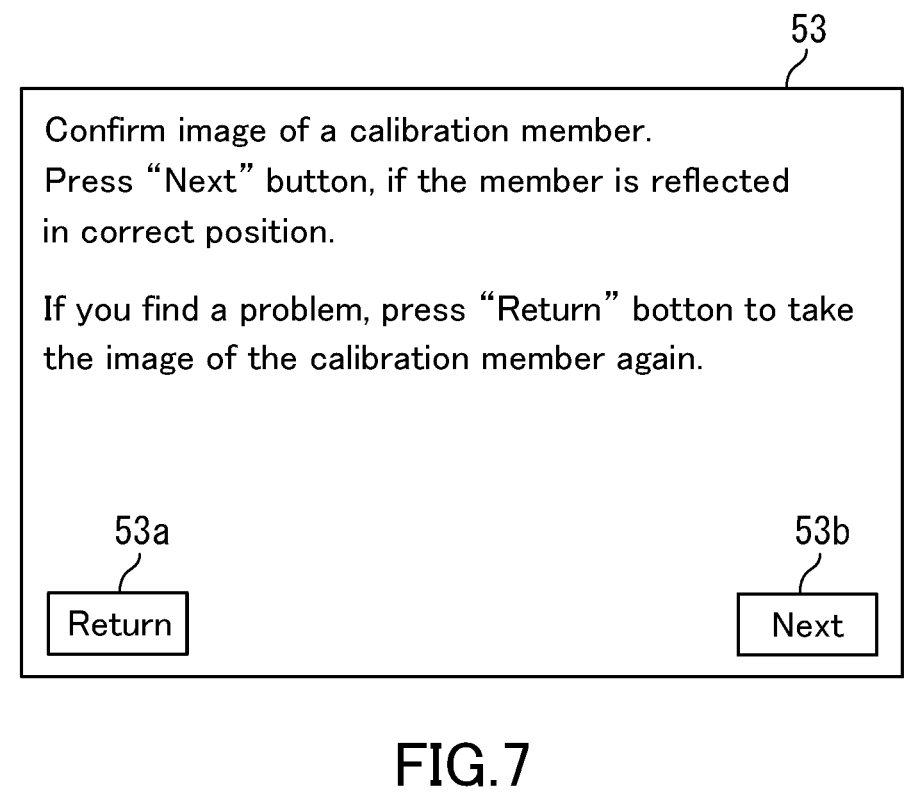

Confirm image of a calibration member.
Press "Next" button, if the member is reflected
in correct position.

If you find a problem, press "Return" botton to take
the image of the calibration member again.

53a

| Return |

53b

| Next |

Image of a member for confirmation will be taken.

Carry-in a member of PET 40mm thickness.

54a

Cancel

Confirm image of a member for confirmation.
Press "Next" button, if the member is reflected
in correct position.

If you find a problem, press "Return" botton to take
the image of the member for confirmation again.

55a

Return

55b

Next (PET) 20mm        61a (PET) 40mm        61b (PET) 60mm        61c

61

X-RAY INSPECTION APPARATUS

FIELD OF THE INVENTION

The present invention relates to an X-ray inspection apparatus.

PRIOR ART

An X-ray inspection apparatus irradiates an X-ray to an object to be inspected that is sequentially transported on a transportation path at a predetermined interval to inspect whether or not a foreign matter is mixed in the object to be inspected or shortage of the object to be inspected using the transmission amount of the irradiated X-ray, wherein the object includes for example, meat, fish, processed foods, medicines, and the like.

An X-ray inspection apparatus is, for example, incorporated into an inspection line for an inspection of foreign matter mixture or an inspection of final weight to perform an inspection of foreign matter mixture or the like.

In the X-ray inspection apparatus, the transportation path of the object to be inspected is irradiated with X-rays having a width in a direction orthogonal to the transportation direction, and the X-rays transmitted through the object to be inspected are received by a plurality of sensor elements arranged in a direction orthogonal to the transportation direction of the object to be inspected. Then image information that expresses the difference in the transmittance of each part of the object to be inspected with respect to X-rays by shading is obtained by the X-ray inspection apparatus, and by performing various processes on this image information, the presence or absence of a foreign matter and whether or not the contents are missing or fragmented can be determined by the X-ray inspection apparatus.

In such an X-ray inspection apparatus, since X-rays are emitted so as to spread in a direction orthogonal to the transportation direction, each sensor element is affected by the difference in the distance from the X-ray generation source to the X-ray sensor elements. As a result, the intensity of X-rays incident on each sensor element is not uniform (see, for example, paragraphs 0005 to 0008 of Patent Document 1).

Further, there is a difference in sensitivity for each sensor element, and when a plurality of sensor arrays or sensor modules composed of a plurality of sensor elements are arranged, a difference in sensitivity for each sensor array and each sensor module also occurs.

In Patent Document 1, described is an X-ray inspection apparatus, wherein a calibration member is used to change the incident conditions of X-rays common to the sensor elements to two or more types to obtain calibration data which is necessary for a uniform density of the image data for each incident condition changed by the calibration member.

PRIOR ART DOCUMENTS

Patent Document

[Patent Document 1] Japanese Patent No. 6717784

SUMMARY OF THE INVENTION

Problems to be Solved by the Invention

In Patent Document 1, it is described, in paragraph 0092 thereof, that it is necessary to obtain calibration data at the time of manufacturing the inspection apparatus itself, at the time of replacing maintenance parts that affect X-rays, at the time of adding optional parts, and the like, wherein it is supposed to be done mainly by equipment manufacturers and service personnel.

However, there is a demand to be able to obtain calibration data frequently in a condition that the X-ray inspection apparatus is incorporated in the inspection line since the inspection may be performed with higher accuracy when a calibration member suitable for the X-ray irradiation intensity of each type of the object to be inspected is used.

Therefore, an object of the present invention is to provide an X-ray inspection apparatus capable of setting calibration conditions suitable for the object to be inspected and performing inspection with high accuracy.

Means to Solve the Problems

In order to solve the above problems, the X-ray inspection apparatus of the present invention comprises: a transportation unit that transports an object to be inspected so that the object to be inspected passes a predetermined inspection area; an X-ray generation source that irradiates an X-ray to the inspection area; an X-ray detection unit that receives the X-ray that has passed the inspection area with a plurality of sensor elements lined up in a direction orthogonal to a transportation direction of the object to be inspected; an image data generation unit that generates an image data of the object to be inspected from an output of the X-ray detection unit; a good or not determination unit that performs quality inspection of the object to be inspected based on the image data generated by the image data generation unit and a predetermined determination criterion; and a control unit that controls the quality inspection of the object to be inspected, wherein the control unit is configured to be switchable between an inspection mode in which the quality inspection of the object to be inspected is performed and a calibration mode in which a calibration data necessary for density of an image of the image data generated by the image data generation unit becomes uniform is generated in a state where there is not the object to be inspected in the inspection area, the control unit includes a calibration data generation unit that generates the calibration data based on an image data generated by the image data generation unit before and after placing a calibration member in the inspection area in the calibration mode, and a correction unit that corrects the image data acquired when the object to be inspected passes the inspection area based on the calibration data in the inspection mode.

By this configuration, calibration conditions suitable for the object to be inspected are set, so that inspection can be performed with high accuracy.

In a preferred embodiment of the present invention, a calibration condition setting unit is further provided for setting calibration conditions based on the article information of the object to be inspected, wherein the setting conditions includes member conditions of the calibration member, and the calibration condition setting unit is arranged to set the calibration conditions based on data of the object inspected in the inspection mode.

By this configuration, calibration conditions are set based on the characteristics of the object to be inspected in the inspection mode, so that the inspection can be performed with high accuracy.

Further, in a preferred embodiment of the present invention, a calibration member detection unit that detects that the calibration member has been transported to the inspection area in the inspection mode, is further provided, and the calibration member detection unit switches to the calibration mode when it is detected that the calibration member is transported.

By this configuration, the calibration can be performed automatically even during inspection, and the calibration can be performed while the inspection apparatus is incorporated in the inspection line.

Further, in a preferred embodiment of the present invention, a display operation unit that accepts an operator's operation and displays information for the operator is further provided, and in the calibration mode, the calibration procedure is instructed and operated by a wizard-type screen displayed on the display operation unit.

By this configuration, the operator can perform the calibration according to the procedure displayed on the display operation unit, so that the calibration can be easily performed while the inspection apparatus is incorporated in the inspection line.

Further, in a preferred embodiment of the present invention, the wizard-type screen in the calibration mode may be configured to instruct and operate to use the calibration member set in the calibration conditions.

By this configuration, the calibration is performed using the calibration member suitable for the object to be inspected, so that the calibration can be easily performed while the inspection apparatus is incorporated in the inspection line, so that the inspection can be performed with high accuracy.

Advantageous Effect of the Invention

The present invention can provide an X-ray inspection apparatus capable of setting calibration conditions suitable for the object to be inspected and of performing the inspection with high accuracy.

BRIEF DESCRIPTION OF THE DRAWINGS

FIG. 6 is a diagram showing a wizard screen at the time of bring in instruction of a calibration member of the X-ray inspection apparatus according to the embodiment of the present invention.

FIG. 7 is a diagram showing a wizard screen at the time of confirming a calibration member of the X-ray inspection apparatus according to the embodiment of the present invention.

FIG. 8 is a diagram showing a wizard screen at the time of instructing to bring in a confirmation member of the X-ray inspection apparatus according to the embodiment of the present invention.

DESCRIPTION OF EMBODIMENTS OF THE PRESENT INVENTION

Hereinafter, the embodiment of the present invention will be described with reference to the drawings.

Figure 1:
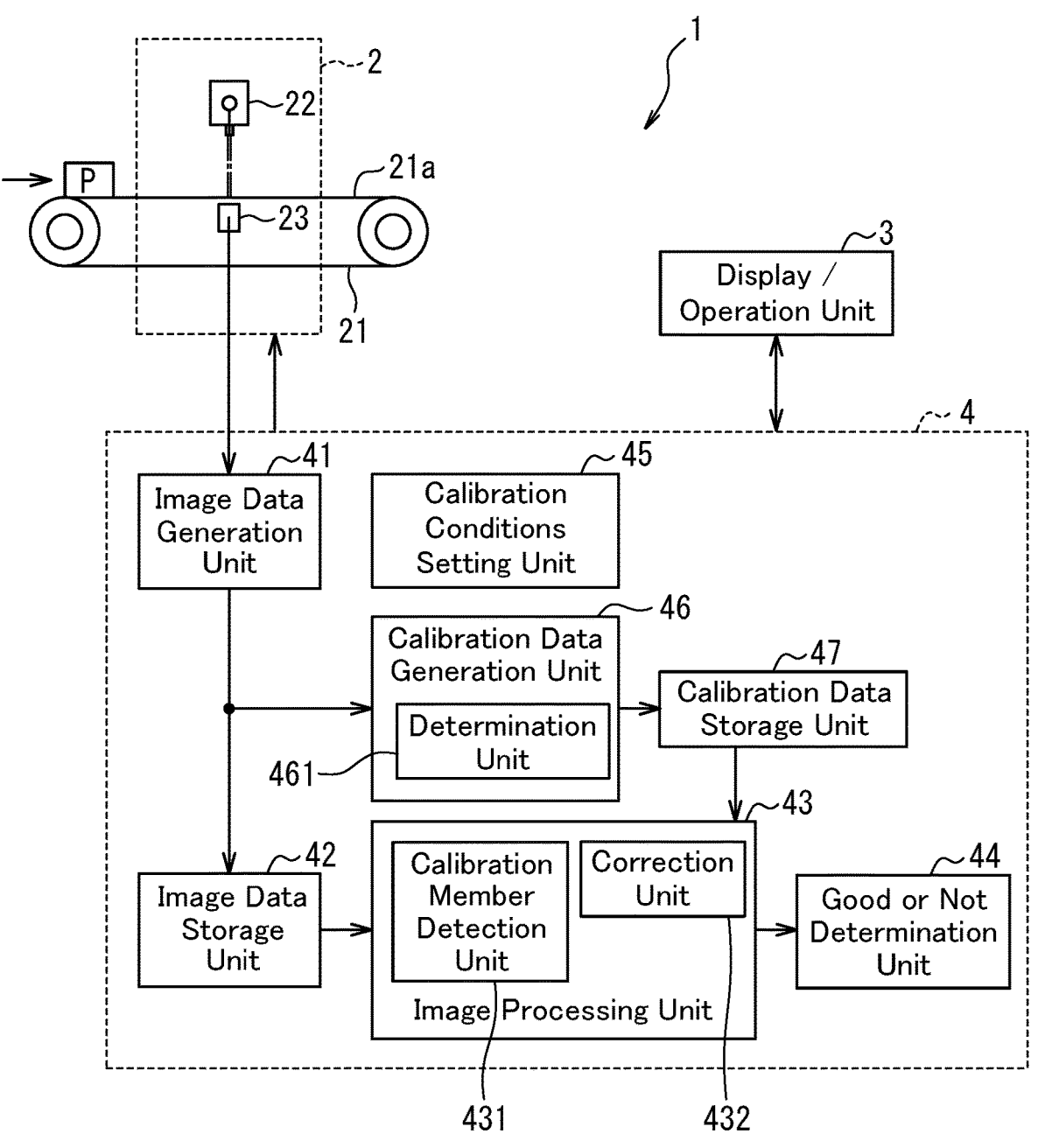
FIG. 1 is a schematic configuration diagram of an X-ray inspection apparatus according to one embodiment of the present invention.

In FIG. 1, the X-ray inspection apparatus 1 according to one embodiment of the present invention includes an inspection unit 2, a display operation unit 3, and a control unit 4 that controls them.

The inspection unit 2 includes a transportation unit 21, an X-ray generation source 22, and an X-ray detection unit 23.

Figure 11:
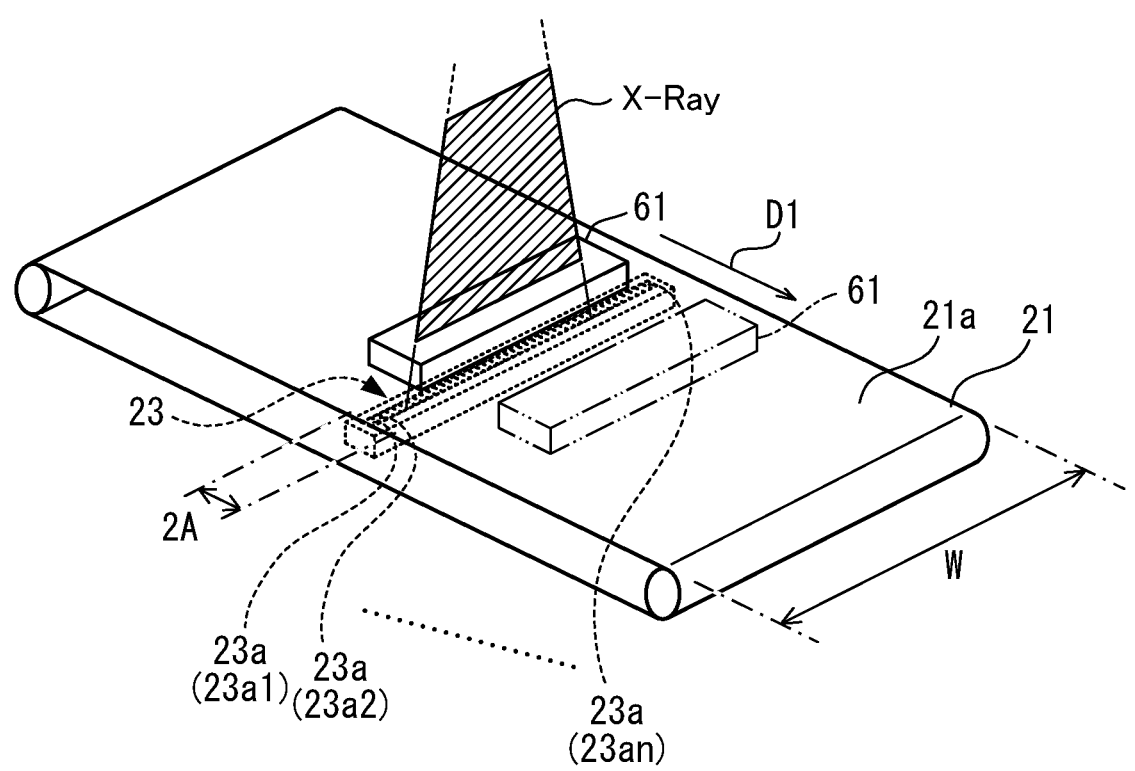
FIG. 11 is a schematic perspective view of a main part showing the vicinity of the X-ray detection area of the inspection unit in the X-ray inspection apparatus according to the embodiment of the present invention.

The transportation unit 21 transports an object to be inspected P in a predetermined direction as indicated by an arrow D1 in FIG. 11, so that the object to be inspected P passes inside a predetermined inspection area 2A (See FIG. 11). As the transportation unit 21, for example, a member that has a transportation path 21a for horizontally transporting the object to be inspected P at a constant speed, such as a belt surface of a belt conveyor, is used.

The X-ray generation source 22 outputs X-rays to the inspection area 2A where the object P to be inspected passes. In the present embodiment, X-rays extending in the width direction (direction of an arrow W in FIG. 11) of the transportation path 21a of the transportation unit 21 are basically emitted from above the object P to be inspected which is transported by the transportation unit 21. However, the emission direction of the X-rays is not limited to this, and the X-rays may be emitted to spread in the horizontal direction from the side of the object P to be inspected.

In the X-ray generation source 22, a hot cathode X-ray tube or a lattice-controlled hot cathode X-ray tube that accelerates the electrons emitted from the heated filament to collide with the target of the anode and emit X-rays is used as an X-ray generation source, and a power supply required to drive the X-ray tube is also included.

The energy of X-ray photons outputted by the X-ray generation source 22 having the above structure is not constant, having variations, and the energy of X-ray photons depends on the wavelength of X-rays. This means that the X-rays outputted by the X-ray generation source 22 include a plurality of different wavelength regions. The X-ray energy outputted by the X-ray generation source 22 needs to be set in a range suitable for inspection of the object to be inspected. This setting is generally performed by controlling the tube voltage and tube current applied to the X-ray tube.

The X-ray detection unit 23 has a plurality of sensor elements, each of which has a function to receive X-rays and convert them into electric signals, for example, as shown in FIG. 11, a predetermined number of n sensor elements 23a1, 23a2, . . . , 23an, and these sensor elements 23a1 to 23an (hereinafter, also simply referred to as sensor elements 23a) are lined up in a single line, at a predetermined position in the transportation direction in the inspection area 2A in which X-rays transmitted through the object P to be inspected are received, in a direction intersecting the transportation direction, in this example, a transportation path width direction W which is an orthogonal direction.

In the present embodiment, each sensor element 23a is a photon detection type (CdTe sensor) that outputs a pulse signal having a peak value corresponding to the energy of the photon each time an X-ray photon transmitted through the object P to be inspected is inputted, and the number of pulses outputted per unit time represents the degree of shading (bright or dark) of the image. As each sensor element 23a, a scintillator type photosensor, that generates visible light by incident X-rays, receives the visible light by the photosensor, and converts it into an electric signal, may be used.

The display operation unit 3 is constituted by a touch panel having both an input operation function and a display function, and the input operation function includes a setting operation of the type of the object P to be inspected to be transported by the transportation unit 21 and an operation of setting the type of the object P to be inspected, various setting operations and instruction operations related to foreign matter detection can be performed. When performing such an input operation, an image for performing the input operation is displayed on the display operation unit 3. In this image, buttons for which input operations are performed and headings, as well as explanations of the buttons, and the like are displayed.

Further, the display operation unit 3 is provided with various kinds of operation buttons such as the operation button for instructing the start of operation of the X-ray inspection apparatus 1, the stop button for instructing the stop of operation of the X-ray inspection apparatus 1, a mode change button for instructing the switching of the modes of the X-ray inspection apparatus 1, and a menu button.

Further, as a display function, the display operation unit 3 is arranged to display various displays such as a set value when setting the product type of the object P to be inspected, an instruction value when instructing an operation, and various determination results or the like.

The display operation unit 3 may have a configuration in which the input operation function and the display function are independent from each other. In this case, a plurality of keys, switches, and the like used for input operations such as setting and instructing are provided for the input operation function, and a liquid crystal display or the like is provided for the display function.

Figure 12:
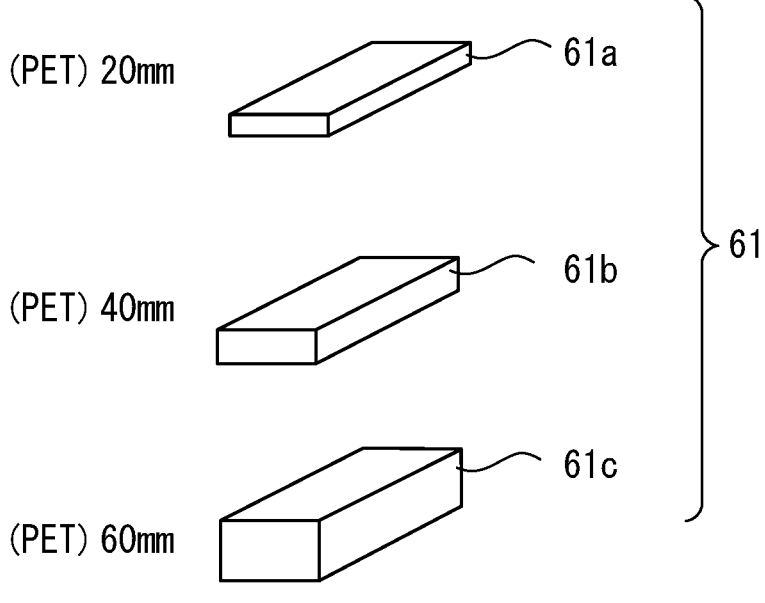
FIG. 12 is a perspective view illustrating a plurality of types of calibration members used in the X-ray inspection apparatus according to the embodiment of the present invention.

As a mode of the X-ray inspection apparatus 1, the control unit 4 is designed to switch between an inspection mode to inspect the object P to be inspected, and a calibration mode to calibrate the X-ray detection unit 23, for example, using a predetermined calibration member 61 which is one or more of a plurality of types of calibration members 61a, 61b, 61c as shown in FIG. 12 (see FIG. 11). Here, the plurality of types of calibration members 61a, 61b, and 61c have different thicknesses. For example, the calibration member 61a is, for example, a flat plate-shaped having a PET (polyethylene terephthalate) 20 mm thickness, the calibration member ber 61b is, for example, a flat plate-shaped having a PET (polyethylene terephthalate) 40 mm thickness, and the calibration member 61c is, for example, a flat plate or a block-shaped having a PET (polyethylene terephthalate) 60 mm thickness. Alternatively, as illustrated in paragraph 0068 of Patent Document 1, the calibration member 61 may be a flat plate of uniform material with a transmittance of less than 100% (for example, 50%) of X-rays transmitted from the upper surface to the lower surface of the plate shape, a stack of plates of uniform material with a constant thickness in multiple stages (for example, two stages), a material in which the thickness changes between the front end and the rear end in the transportation direction with a constant material, and the X-ray transmittance changes from 50% to 20%, for example, or the like, or two plates each having a thickness varying from the front end to the rear end, made of different materials (for example, the X-ray transmittance of between 50% and 20% for one, and the X-ray transmittance of between 70% and 90% for the other) may be laminated to form a plate having a predetermined thickness.

In the inspection mode, the control unit 4 performs an inspection processing to acquire an X-ray transmission image of the object P to be inspected transported by the transportation unit 21, to determine the presence or absence of a foreign matter, and to determine good or not of the object P to be inspected.

In the calibration mode, the control unit 4 generates calibration data for calibrating the variations of the sensor elements 23a1 to 23an of the X-ray detection unit 23, based on the X-ray transmission image of the calibration member placed in the inspection area 2A of the transportation unit 21. The control unit 4 creates calibration data using one calibration member as exemplified as the calibration member 61, or a plurality of calibration members having different thicknesses.

It should be noted that the X-ray transmission image of the calibration member may be acquired to generate the calibration data without driving the transportation unit 21. In this case, the accuracy of the calibration data is higher. If the calibration member is not large enough to cover the entire sensor elements of the X-ray detection unit 23, the X-ray transmission image of the calibration member may be divided into a plurality of times for the entire sensor of the X-ray detection unit 23 to collect the divided images to generate calibration data.

The control unit 4 sets calibration conditions including the conditions of the calibration member (member conditions such as material, thickness, width, length, transmittance distribution, and the like), from the inspection object information such as the material and thickness of the object P to be inspected.

The control unit 4 sets the material and thickness of the calibration member suitable for calibration, from the set inspection object information such as the material and thickness of the object P to be inspected.

The control unit 4 may set calibration conditions based on the data of the object P to be inspected which has been inspected in the inspection mode.

As the material of the calibration member, when the object P to be inspected is meat, polyacetal resin, polyethylene terephthalate, acrylic resin, water encapsulated in a resin water container, and the like are preferable.

Further, if the object P to be inspected contains fat, then, polyethylene, oil sealed in a resin water container, or the like is preferable. If it contains bone or salt, then, aluminum, polyvinyl chloride, and the like are preferable.

When the calibration mode is selected by the display operation unit 3, the control unit 4 guides the calibration procedure on a wizard-type screen (interactive screen; hereinafter also referred to as a wizard screen). The control unit 4 may guide to input information (article information) such as the material and thickness of the object P to be inspected on the wizard screen, and display guide information so as to use a calibration member suitable for the material and thickness.

The control unit 4 may set calibration conditions based on the data of the object P to be inspected which has been inspected in the inspection mode.

When the control unit 4 detects that the calibration member has been transported to the inspection area 2A by the transportation unit 21, it generates calibration data, and if there is a problem with the image after calibration, then error-stopping of the X-ray inspection apparatus 1 is performed.

Figure 2:
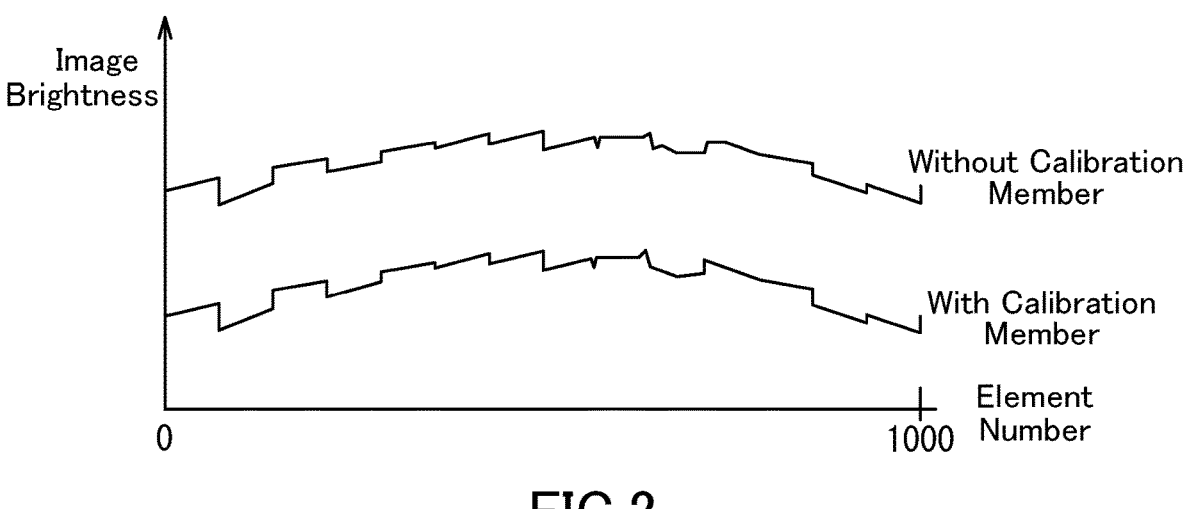
FIG. 2 shows an image brightness distribution corresponding to the output of a plurality of sensor elements when calibrating an X-ray detection unit of an X-ray inspection apparatus according to the embodiment of the present invention, and shows the change of image brightness by a calibration member.

Since the calibration member is a member having a uniform predetermined transmittance over the entire area in the main scanning direction in which the plurality of sensor elements 23a1 to 23an of the X-ray detection unit 23 are lined up, when the calibration member is detected by the X-ray detection unit 23, as the image brightness distribution corresponding to the output of the plurality of sensor elements 23a1 to 23an (exemplified by n=1000 in the drawing) is shown in FIG. 2, the brightness of the image data uniformly decreases in a detection range in the main scanning direction in which the plurality of sensor elements 23a1 to 23an are lined up. Utilizing this, calibration data is generated by capturing the fact that the calibration member is transported and reaches the inspection area 2A, and the brightness is changed from the brightness under the condition in which nothing is on the belt of the transportation unit 21 to the brightness obtained by passing through the calibration member.

The control unit 4 determines whether or not there is a calibration member, for example, by whether or not the image data brightness has changed uniformly (varied by the amount of the calibration member) as a whole, or whether or not the brightness of the image data at both ends and at a predetermined position (center or a position having an interval shorter than the width of the object P to be inspected) has changed uniformly. It is preferable to perform determination using data obtained by filtering the image data to remove noise.

In FIG. 1, the control unit 4 includes an image data generation unit 41, an image data storage unit 42, an image processing unit 43, a good or not determination unit 44, a calibration condition setting unit 45, a calibration data generation unit 46, and a calibration data storage unit 47.

The image data generation unit 41 performs a predetermined signal processing by dividing signals respectively outputted from the plurality of sensor elements 23a1 to 23an into predetermined periods of time (hereinafter referred to as scanning periods of time) while the object P to be inspected is passing through a space between the X-ray generation source 22 and the X-ray detection unit 23, and generates the image data of the object P to be inspected, consisting of two dimensional position information determined by the passing direction of the object P to be inspected and the arrangement direction of the sensor elements 23a1 to 23an, and the signal processing result for each position, per each of different wavelength regions. It should be noted that each of the scanning periods of time determines a detection unit in the transportation direction with respect to the object P to be inspected, and is sufficiently shorter than the article passing time obtained by dividing the length of the object P to be inspected by the transportation speed.

The image data storage unit 42 stores the image data generated by the image data generation unit 41. The image processing unit 43 performs predetermined image processing on the image data stored in the image data storage unit 42.

The image processing unit 43 includes a calibration member detection unit 431 and a correction unit 432. The calibration member detection unit 431 detects that a predetermined calibration member has been transported to the inspection area between the X-ray generation source 22 and the X-ray detection unit 23 by the method described above.

The correction unit 432 corrects the image data generated by the image data generation unit 41 based on the abovementioned calibration data of the X-ray detection unit 23 stored in the calibration data storage unit 47.

The good or not determination unit 44 determines the good or not of the object P to be inspected, by performing the quality inspection to determine the presence or absence of foreign matter in the object P to be inspected, based on the image data image-processed by the image processing unit 43 and the determination criterion set in advance.

The calibration condition setting unit 45 sets the calibration conditions including the conditions of the calibration member based on the set inspection object information such as the material and thickness of the object P to be inspected. The calibration condition setting unit 45 sets the material and thickness of the calibration member suitable for calibration based on the set information such as the material and thickness of the object P to be inspected.

The calibration condition setting unit 45 may set the material and thickness of the calibration member, based on the data of the object P to be inspected which has been inspected in the inspection mode.

The calibration data generation unit 46 generates the calibration data of the X-ray detection unit 23, based on the image data acquired from the calibration member in the calibration mode described above.

The calibration data generation unit 46 is provided with a determination unit 461 that determines whether or not the generated calibration data is correct, based on whether or not the brightness of the X-ray image of the calibration member is uniform within a predetermined brightness range. The calibration data storage unit 47 stores the calibration data generated by the calibration data generation unit 46.

Figure 3:
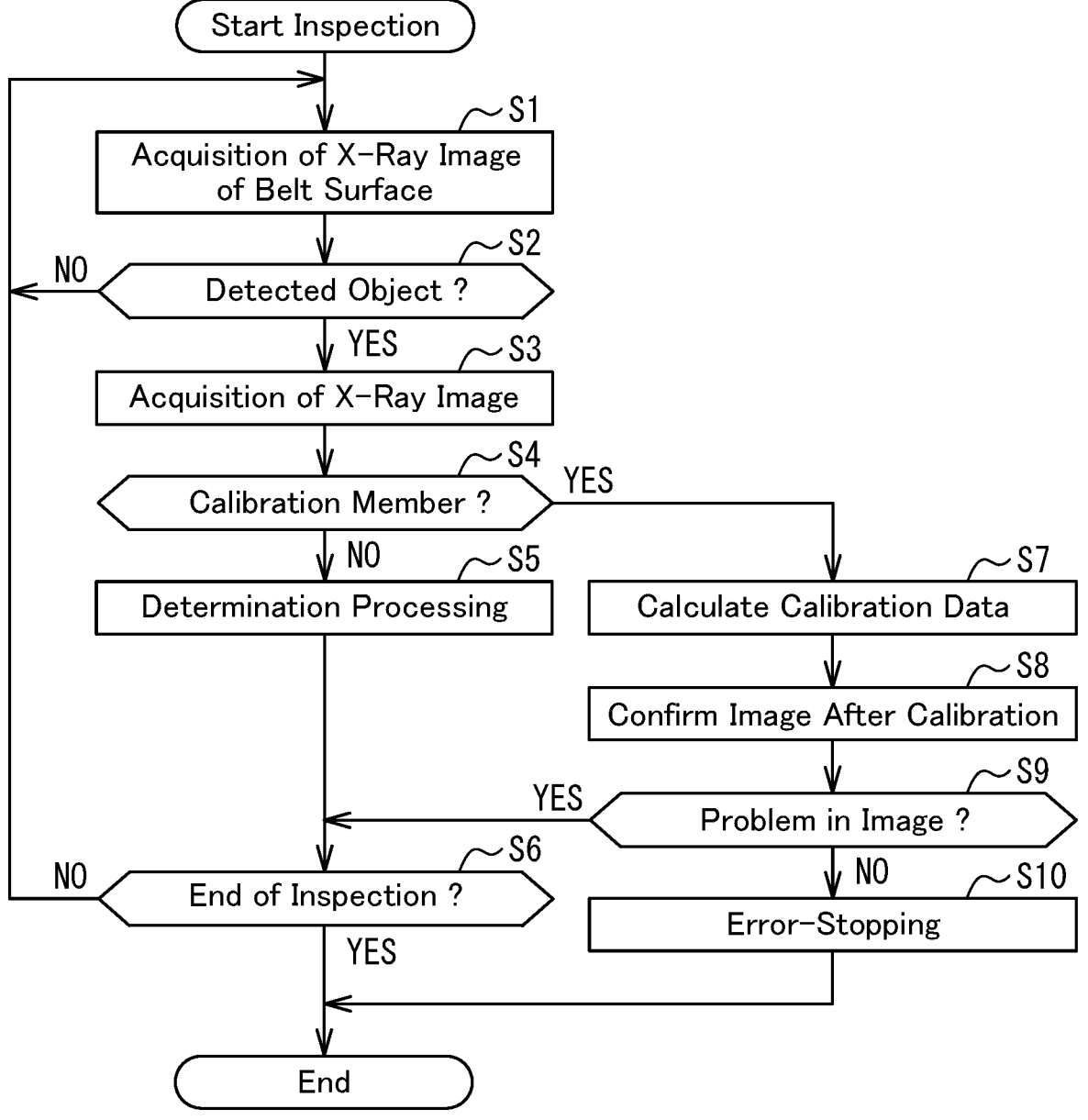
FIG. 3 is a flowchart illustrating a procedure for inspection processing of the X-ray inspection apparatus according to the embodiment of the present invention.

The inspection process by the X-ray inspection apparatus according to the present embodiment configured as described above will be described with reference to FIG. 3. The inspection process described below is performed when the inspection mode is selected.

In step S1, the control unit 4 acquires an X-ray image of the belt surface of the transportation unit 21. After performing the process of step S1, the control unit 4 performs the process of step S2.

In step S2, the control unit 4 determines whether or not an article is detected from the X-ray image.

If it is determined that the article has been detected, the control unit 4 performs the process of step S3. If it is determined that the article has not been detected, the control unit 4 performs the process of step S1.

In step S3, the control unit 4 acquires an X-ray image of the detected article. After performing the process of step S3, the control unit 4 performs the process of step S4.

In step S4, the control unit 4 determines whether or not the detected article is a calibration member.

If it is determined that the member is a calibration member, the inspection mode is shifted to the calibration mode, and the control unit 4 performs the process of step S7. If it is determined that the member is not a calibration member, the control unit 4 performs the process of step S5.

In step S5, the control unit 4 determines the presence or absence of a foreign matter or the like from the X-ray image, and executes a determination process for determining good or not of the article. After performing the process of step S5, the control unit 4 performs the process of step S6.

In step S6, the control unit 4 determines whether or not the inspection has been terminated. When it is determined that the inspection is terminated, the control unit 4 terminates the inspection process. If it is determined that the inspection has not been terminated, the control unit 4 performs the process of step S1.

In step S7, the control unit 4 calculates calibration data from the X-ray image of the calibration member. After performing the process of step S7, the control unit 4 performs the process of step S8.

In step S8, the control unit 4 confirms the brightness of the calibrated image corrected by the calibration data which has been calculated by the X-ray image of the calibration member. After performing the process of step S8, the control unit 4 performs the process of step S9.

In step S9, the control unit 4 determines whether or not there is no problem with the image based on the brightness of the image after calibration.

If it is determined that there is no problem with the image, the calibration mode is shifted to the inspection mode, and the control unit 4 performs the process of step S6. If it is determined that there is a problem with the image, the control unit 4 performs the process of step S10.

In step S10, the control unit 4 causes the X-ray inspection apparatus 1 to perform error-stopping. After performing the process of step S10, the control unit 4 terminates the inspection process.

Figure 4:
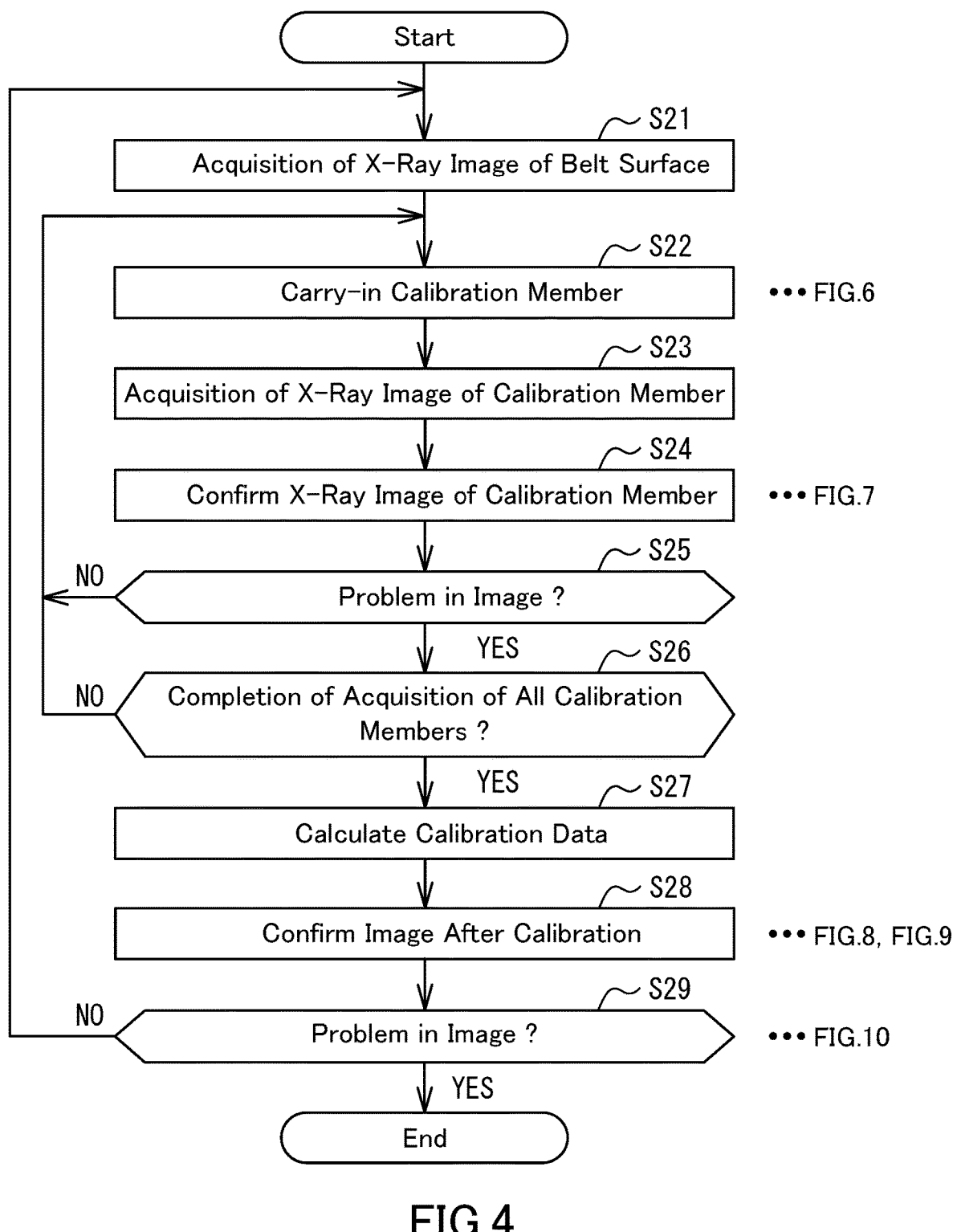
FIG. 4 is a flowchart illustrating a procedure for calibration processing of an X-ray inspection apparatus according to an embodiment of the present invention.
Figure 5:
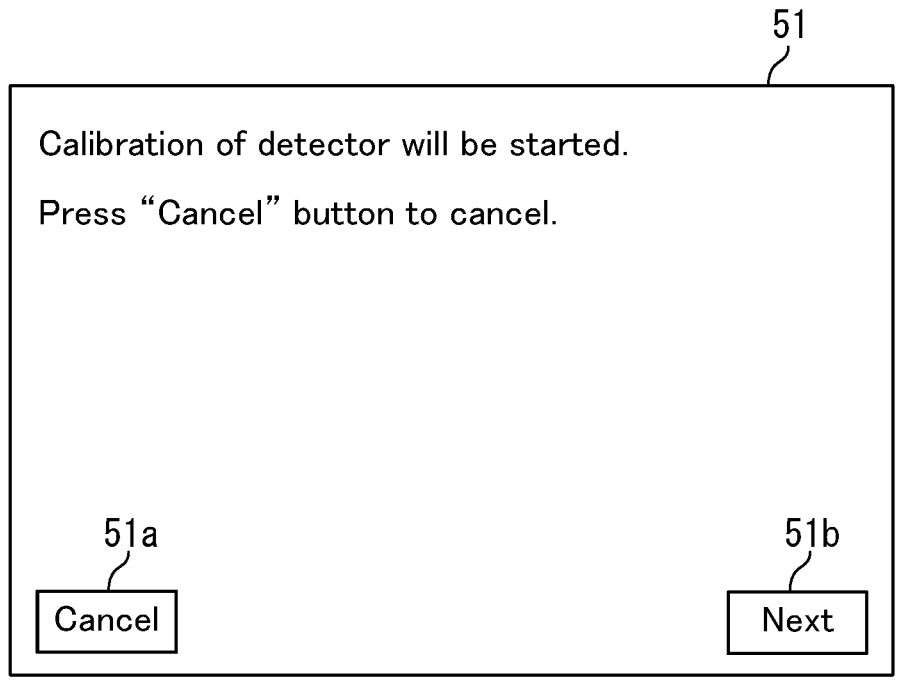
FIG. 5 is a diagram showing a wizard screen at the start of calibration processing of the X-ray inspection apparatus according to the embodiment of the present invention.

The calibration process when the calibration mode is selected from the display operation unit 3 by the X-ray inspection apparatus according to the present embodiment will be described with reference to FIG. 4. In the calibration mode, the display operation unit 3 causes the wizard screen to be displayed to allow the operator to perform calibration. When the calibration mode is selected, the control unit 4 causes, at first, the display operation unit 3 to display the wizard screen 51 for starting calibration as shown in FIG. 5, and when the "Next" button 51b is selected, the calibration process shown in FIG. 4 is started. Further, in the present embodiment, when the "Cancel" button 51a, 52a or 54a is selected and operated in any of the wizard screens 51, 52 or 54 for the calibration process, the calibration process is terminated at that stage. Further, when the "Return" button 53a, 55a or 56a in the wizard screens 53, 55 or 56 is selected and operated, the process of returning to the wizard screen of the immediately preceding step is performed.

In step S21, the control unit 4 acquires an X-ray image of the belt surface of the transportation unit 21. After performing the process of step S21, the control unit 4 performs the process of step S22.

Figure 6:
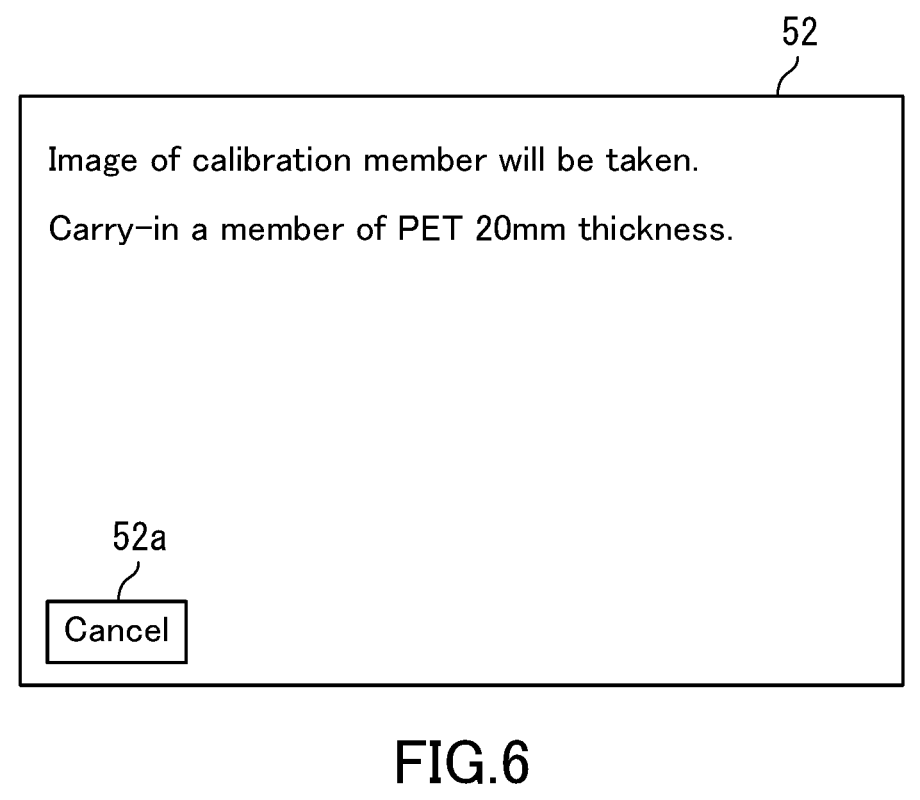

In step S22, the control unit 4 causes the display operation unit 3 to display a wizard screen 52 as shown in FIG. 6, that prompts the carry-in of the calibration member for taking the image of the calibration member, to have the operator carry-in the designated calibration member to the inspection area of the transportation unit 21. FIG. 6 shows a case where a PET 20 mm thick member is used as the calibration member as an example. After performing the process of step S22, the control unit 4 performs the process of step S23.

In step S23, the control unit 4 acquires an X-ray image of the calibration member. After performing the process of step S23, the control unit 4 performs the process of step S24.

In step S24, the control unit 4 displays the wizard screen 53 as shown in FIG. 7 on the display operation unit 3 and confirms whether the calibration member is reflected at the correct position in the X-ray image of the calibration member. After performing the process of step S24, the control unit 4 performs the process of step S25.

In step S25, the control unit 4 determines whether or not there is no problem with the image after "Next" is selected on the wizard screen 53 of FIG. 7.

If it is determined that there is no problem with the image, the control unit 4 performs the process of step S26. When it is determined that there is a problem with the image after "Return" is selected on the wizard screen 53 of FIG. 7, the control unit 4 performs the process of step S22.

In step S26, the control unit 4 determines whether or not the acquisition of the X-ray image of all the calibration members including the calibration member 61 has been completed.

When it is determined that the acquisition of the X-ray images of all the calibration members has been completed, the control unit 4 performs the process of step S27. If it is determined that the acquisition of the X-ray images of all the calibration members has not been completed, the control unit 4 performs the process of step S22. As the X-ray image of the calibration member, it is preferable to acquire an X-ray image of a plurality of members having different thicknesses, such as a member having a PET 20 mm thickness and a member having a PET 60 mm thickness.

In step S27, the control unit 4 calculates calibration data from the acquired X-ray image. After performing the process of step S27, the control unit 4 performs the process of step S28.

Figure 8:
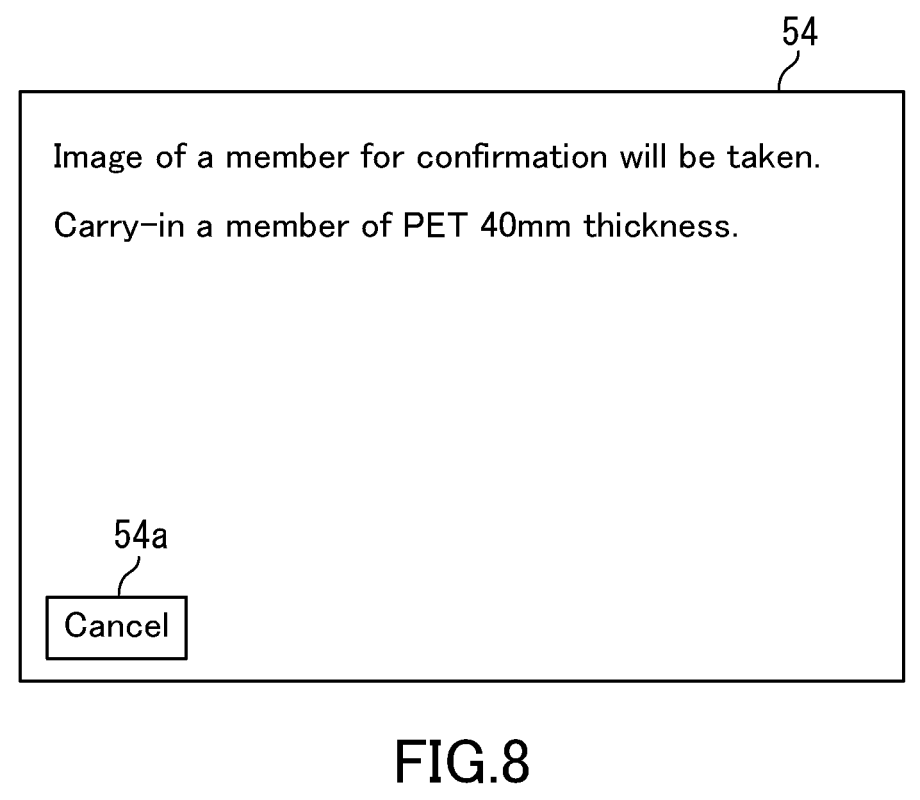
Figure 9:
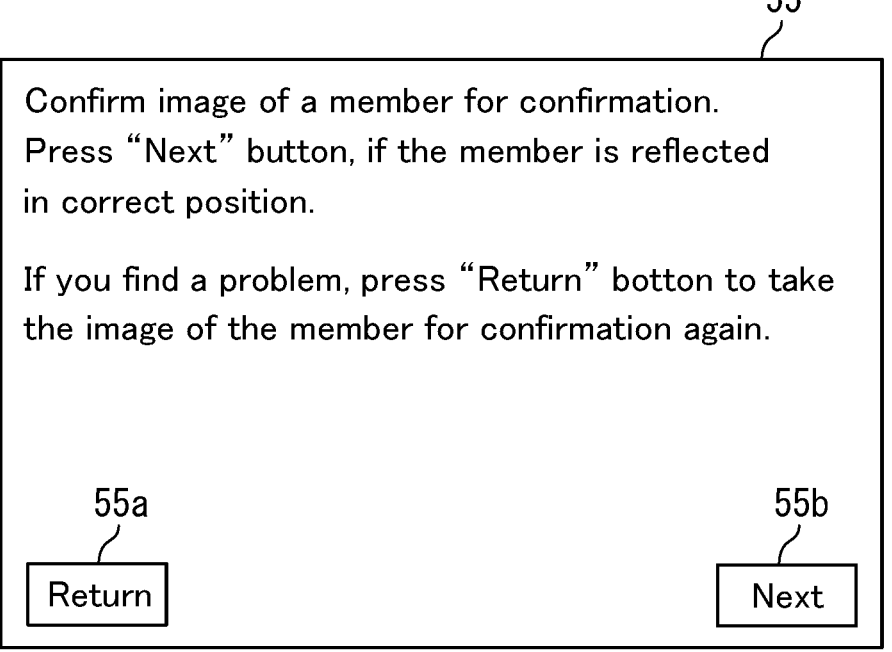
FIG. 9 is a diagram showing a wizard screen at the time of confirming a confirmation member of the X-ray inspection apparatus according to the embodiment of the present invention.
Figure 10:
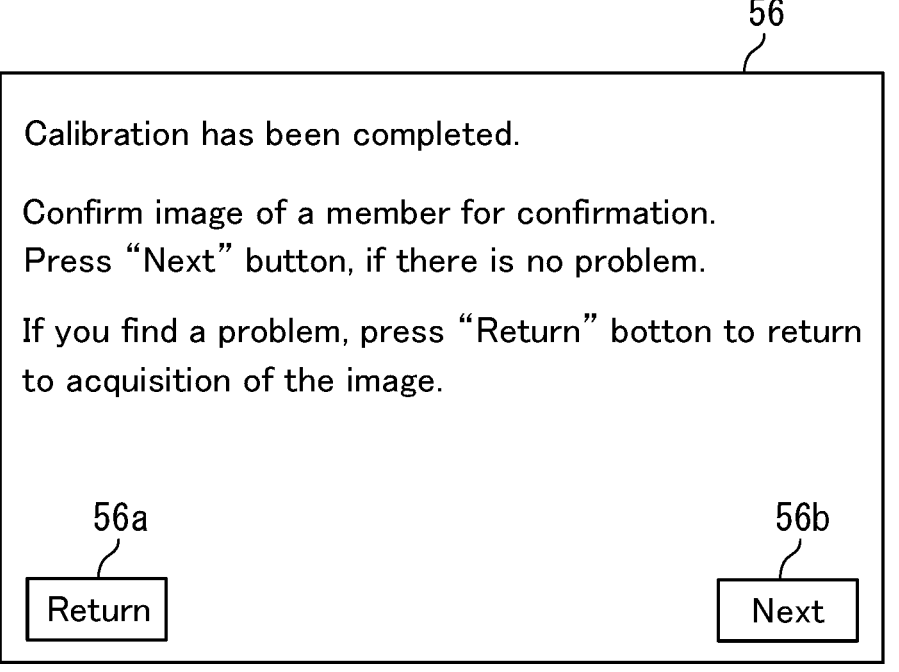
FIG. 10 is a diagram showing a wizard screen at the time of instructing confirmation of a calibration image of the X-ray inspection apparatus according to the embodiment of the present invention.

In step S28, the control unit 4 causes the wizard screen 54 to be displayed as shown in FIG. 8 on the display operation unit 3, causes the confirmation member to be carried-in, acquires an X-ray image, causes the wizard screen 55 as shown in FIG. 9 to be displayed on the display operation unit 3, confirms whether the confirmation member is displayed at the correct position of the X-ray image of the confirmation member, causes the X-ray image corrected by the calculated calibration data to be displayed on the display operation unit 3, and at the same time causes the wizard screen 56 as shown in FIG. 10 to be displayed on the display operation unit 3, and causes the image after calibration confirmed. FIG. 8 shows, as an example, a case where a member having a PET 40 mm thickness is used as the confirmation member. After performing the process of step S28, the control unit 4 performs the process of step S29. Here, it is supposed to acquire an X-ray image of a member having a PET 40 mm thickness and confirm the X-ray image after calibration.

In step S29, the control unit 4 determines whether or not there is no problem with the image after "Next" has been selected on the wizard screen 56 of FIG. 10.

If it is determined that there is no problem with the image, the control unit 4 terminates the calibration process. After "Return" is selected on the wizard screen 56 of FIG. 10 and when it is determined that there is a problem with the image, the control unit 4 performs the process of step S21.

Thus, in the above embodiment, the control unit 4 sets the calibration conditions including the conditions of the calibration member, from the information of the set object P to be inspected, such as the material and thickness.

By this, the calibration conditions suitable for the object to be inspected are set, so that it is possible to perform inspection with high accuracy.

Further, the control unit 4 sets the calibration conditions based on the data of the object P to be inspected which has been inspected in the inspection mode.

By this, calibration conditions are set based on the characteristics of the object P to be inspected acquired in the inspection mode, so that it is possible to perform the inspection with high accuracy.

Further, the control unit 4 switches to the calibration mode when it is detected that the calibration member has been transported to the inspection area during the inspection mode.

By the above, even during the inspection mode, calibration of the X-ray detection unit 23 can be automatically performed, thereby making it possible to perform calibration in the state of being incorporated in the inspection line.

Further, the control unit 4 is adapted to be able to perform a series of instruction operations for calibration through the wizard screens 51 to 56 in the calibration mode. As a result, the operator can perform the calibration by the instruction operation according to the display contents of the display operation unit 3, so that it is possible to perform the calibration easily in a state of being incorporated in the inspection line.

Further, in the wizard screens 52 to 55 of the calibration mode. the control unit 4 instructs to use the calibration member set in the calibration condition.

By the above, the calibration is performed using a calibration material suitable for the object P to be inspected, it is possible to easily perform the calibration in a state of being incorporated in the inspection line, and it is possible to perform the inspection with high accuracy.

Although the embodiments of the present invention have been disclosed above, it is clear that the present invention is not limited to specific embodiments and that a person skilled in the art can modify the embodiments of the invention. Therefore, it is intended that the claimed invention includes an equivalent product to which such modifications and changes have been made without departing from the gist of the present invention.

EXPLANATION OF REFERENCE NUMERALS

1 X-ray Inspection Apparatus
2 Inspection Unit
2A Inspection Area
3 Display/Operation Unit
4 Control Unit
21 Transportation Unit
21*a* Transportation Path
22 X-ray Generation Source
23 X-ray Detection Unit
23*a*, 23*a*1, 23*a*2, . . . 23*an* Sensor Element
41 Image Data Generation Unit
44 Good or not Determination Unit
45 Calibration Conditions Setting Unit
46 Calibration Data Generation Unit
51, 52, 53, 54, 55, 56 Wizard Screen (Wizard-type Screen)
61 Calibration Member
431 Calibration Member Detection Unit
432 Correction Unit
P Object To Be Inspected (Article)

What is claimed is:

1. An X-ray inspection apparatus, comprising:
   a transportation unit that transports an object to be inspected so that the object to be inspected passes a predetermined inspection area;
   an X-ray generation source that irradiates an X-ray to the inspection area;
   an X-ray detection unit that receives the X-ray that has passed the inspection area with a plurality of sensor elements lined up in a direction orthogonal to a transportation direction of the object to be inspected;
   an image data generation unit that generates an image data of the object to be inspected from an output of the X-ray detection unit;
   a good or not determination unit that performs quality inspection of the object to be inspected based on the image data generated by the image data generation unit and a predetermined determination criterion; and
   a control unit that controls the quality inspection of the object to be inspected, wherein:
   the control unit is configured to be switchable between an inspection mode in which the quality inspection of the object to be inspected is performed and a calibration mode in which calibration data to calibrate variations of the sensor elements, necessary for brightness of an image of the image data generated by the image data generation unit becomes uniform in the direction in which the sensor elements are lined up, is generated in a state where there is no object to be inspected in the inspection area,
   the control unit includes a calibration data calculation unit that calculates the calibration data based on an image data generated by the image data generation unit before and after placing a calibration member in the inspection area in the calibration mode, and a correction unit that corrects the image data obtained when the object to be inspected passes the inspection area based on the calibration data in the inspection mode, and
   a calibration member detection unit that detects that the calibration member has been transported to the inspection area in the inspection mode, wherein when the calibration member detection unit detects that the calibration member has been transported by determining whether or not the brightness of the image data has changed as a whole, switching to the calibration mode is performed.

2. The X-ray inspection apparatus according to claim 1, further comprising a calibration conditions setting unit that sets calibration conditions including member condition of the calibration member based on object information of the object to be inspected, wherein the calibration conditions setting unit sets the calibration conditions based on data of the object to be inspected which is inspected in the inspection mode.

3. The X-ray inspection apparatus according to claim 1, further comprising a display operation unit that accepts operation of an operator and displays guide information to the operator, wherein a calibration procedure is instructed and operated by a wizard-type screens displayed on the display operation unit in the calibration mode including information of a material or a thickness of the calibration member to carry-in to the inspection area.

4. The X-ray inspection apparatus according to claim 3, wherein the wizard-type screens in the calibration mode instruct to use the calibration member set in the calibration conditions.

* * * * *